(12) United States Patent
Chan et al.

(10) Patent No.: US 10,872,064 B2
(45) Date of Patent: Dec. 22, 2020

(54) UTILIZING VERSION VECTORS ACROSS SERVER AND CLIENT CHANGES TO DETERMINE DEVICE USAGE BY TYPE, APP, AND TIME OF DAY

(71) Applicant: Razer (Asia-Pacific) Pte. Ltd., Singapore (SG)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 16/178,794

(22) Filed: Nov. 2, 2018

(65) Prior Publication Data

US 2019/0073377 A1   Mar. 7, 2019

Related U.S. Application Data

(63) Continuation of application No. 14/222,533, filed on Mar. 21, 2014, now abandoned.

(Continued)

(51) Int. Cl.
*G06F 1/26* (2006.01)
*G06F 1/32* (2019.01)
(Continued)

(52) U.S. Cl.
CPC .............. *G06F 16/178* (2019.01); *G06F 8/44* (2013.01); *G06F 9/54* (2013.01); *G06F 11/1464* (2013.01); *G06F 16/113* (2019.01);
*G06F 16/116* (2019.01); *G06F 16/122* (2019.01); *G06F 16/16* (2019.01); *G06F 16/168* (2019.01); *G06F 16/1734* (2019.01); *G06F 16/1787* (2019.01); *G06F 16/182* (2019.01);
(Continued)

(58) Field of Classification Search
None
See application file for complete search history.

(56) References Cited

U.S. PATENT DOCUMENTS 8,407,363 B2 * 3/2013 Dote ...................... G06F 9/451
709/232
8,909,950 B1 * 12/2014 Levchuk ............. H04W 52/223
713/300

(Continued)

*Primary Examiner* — Nicholas R Taylor
*Assistant Examiner* — Ho T Shiu
(74) *Attorney, Agent, or Firm* — Mattingly & Malur, PC

(57) ABSTRACT

Some examples include optimizing system performance by generating a version vector that includes a plurality of attributes associated with a computing device. For instance, the plurality of attributes associated with the computing device may include a device type of the computing device. The plurality of attributes from the version vector may be analyzed to determine a usage pattern of a user of the computing device. In addition, a configuration of the computing device may be adjusted based on the usage pattern. In some cases, adjusting of the configuration of the computing device may include adjusting, based on the usage pattern, one or more of a power consumption of the computing device or a CPU running time of the computing device.

18 Claims, 8 Drawing Sheets

US 10,872,064 B2
Page 2

Related U.S. Application Data

(60) Provisional application No. 61/804,134, filed on Mar. 21, 2013.

(51) Int. Cl.

| | | |
|---|---|---|
| *G06F 7/00* | (2006.01) | |
| *H04M 3/00* | (2006.01) | |
| *G06F 16/178* | (2019.01) | |
| *G06F 9/54* | (2006.01) | |
| *G06F 16/16* | (2019.01) | |
| *G06F 16/27* | (2019.01) | |
| *G06F 16/11* | (2019.01) | |
| *G06F 16/182* | (2019.01) | |
| *G06F 16/17* | (2019.01) | |
| *G06F 16/2457* | (2019.01) | |
| *H04L 29/08* | (2006.01) | |
| *H04W 12/06* | (2009.01) | |
| *G06F 11/14* | (2006.01) | |
| *H04L 12/24* | (2006.01) | |
| *H04L 12/911* | (2013.01) | |
| *H04L 29/06* | (2006.01) | |
| *G06F 8/41* | (2018.01) | |

(52) U.S. Cl.
CPC ........ *G06F 16/24578* (2019.01); *G06F 16/27* (2019.01); *H04L 41/0816* (2013.01); *H04L 47/70* (2013.01); *H04L 47/78* (2013.01); *H04L 63/0853* (2013.01); *H04L 67/06* (2013.01); *H04L 67/10* (2013.01); *H04L 67/1095* (2013.01); *H04L 67/1097* (2013.01); *H04L 67/22* (2013.01); *H04L 67/306* (2013.01); *H04L 69/04* (2013.01); *H04W 12/06* (2013.01); *G06F 11/1451* (2013.01); *G06F 11/1469* (2013.01)

(56) References Cited

U.S. PATENT DOCUMENTS

| | | | |
|---|---|---|---|
| 2004/0068481 A1* | 4/2004 | Seshadri | G06F 16/9535 |
| 2004/0097244 A1* | 5/2004 | Yamazaki | H04M 1/72572 |
| | | | 455/456.3 |
| 2004/0109436 A1* | 6/2004 | Vargas | H04L 29/06 |
| | | | 370/350 |
| 2006/0135182 A1* | 6/2006 | Unmehopa | H04L 67/24 |
| | | | 455/456.6 |
| 2007/0005707 A1 | 1/2007 | Teodosiu | |
| 2008/0057894 A1 | 3/2008 | Aleksic | |
| 2008/0195693 A1 | 8/2008 | Gao | |
| 2009/0006498 A1* | 1/2009 | Freedman | G06F 16/256 |
| 2010/0057785 A1* | 3/2010 | Khosravy | G06F 16/273 |
| | | | 707/E17.005 |
| 2011/0224564 A1* | 9/2011 | Moon | A61B 5/00 |
| | | | 600/509 |
| 2012/0023506 A1* | 1/2012 | Maeckel | G06F 9/485 |
| | | | 719/318 |
| 2012/0036498 A1 | 2/2012 | Akirekadu | |
| 2012/0172025 A1 | 7/2012 | Hamalainen | |
| 2013/0147820 A1* | 6/2013 | Kalai | G01C 21/32 |
| | | | 345/522 |
| 2013/0185487 A1* | 7/2013 | Kim | G06F 12/0246 |
| | | | 711/103 |
| 2013/0196615 A1 | 8/2013 | Zalmanovitch | |
| 2013/0262891 A1* | 10/2013 | Gudlavenkatasiva | G06F 1/3212 |
| | | | 713/320 |
| 2014/0095907 A1* | 4/2014 | Nguyen Tien | G06F 1/3203 |
| | | | 713/320 |
| 2014/0152894 A1* | 6/2014 | Childs | H04N 5/76 |
| | | | 348/552 |
| 2014/0274181 A1 | 9/2014 | Lovegren | |
| 2015/0296456 A1* | 10/2015 | Kaikkonen | H04W 52/0216 |
| | | | 370/311 |

* cited by examiner

UTILIZING VERSION VECTORS ACROSS SERVER AND CLIENT CHANGES TO DETERMINE DEVICE USAGE BY TYPE, APP, AND TIME OF DAY

PRIORITY CLAIM

This application is a continuation of, and claims priority to, U.S. patent application Ser. No. 14/222,533, filed Mar. 21, 2014. This application claims to the benefit of U.S. Provisional Patent Application No. 61/804,134, filed on Mar. 21, 2013. These applications are incorporated by reference herein in their entirety.

FIELD OF THE INVENTION

At least one embodiment of the present invention pertains to system optimization, and more particularly, to optimizing system performance according to user's patterns of using computing devices and applications.

BACKGROUND

People today use a number of computing devices to perform various tasks during the course of their day. For instance, a user may use a laptop for work, a tablet for entertainment, a smartphone for phone calls, etc. Further, given the convergence of capabilities amongst the various computing devices, the user may use any of the computing devices to perform many of their tasks.

It will be appreciated that with the proliferation of mobile computing in the form of smartphones, tablets, and laptops, there is a need to help the user manage his or her many devices according to the individual's usage habit and preferences. An individual user may tend to repeatedly use a particular application on a smartphone at approximately 6-7 pm in a train on his way home. Optimizations may be achieved to render a better user experience if information such as the user's preference of device, application, time, and location is determined. Similarly, a group of users' habits and preferences are invaluable information to service providers and businesses.

Version vectors have been used to track causal relations of updates. Version vectors are a data structure used in optimistic replication systems. The form {A1, B3, C6} denotes a version vector, where A, B and C are device ids and 1, 3, and 6 are their respective version numbers. A more detailed description of version vectors is provided in Parker et al., "Detection of Mutual Inconsistency in Distributed Systems," IEEE Transactions on Software Engineering, Vol. SE-9, No. 3, May 1983, pp. 240-247, which is fully incorporated herein by reference.

SUMMARY

Technology introduced herein provides a variety of methods, systems and paradigms for generating version vector, and analyzing the version vector data to determine a user's usage pattern, and optimizing performance of systems at various levels, including system and individual level. Certain aspects can determine usage patterns of computing devices, such as what type of computing device is used, what applications are used, at what time of day. This information about usage patterns and other information that can be found through this data can enable system optimizations on both individual user level and service provider level.

Version vector is a data structure that contains a series of coordinates. In some embodiments of this technology, the coordinates may correspond to various factors such as the type of computing device being used, the application being used, the time at which modifications occurred, etc. One aspect of the technology disclosed herein is to analyze the raw data contained in the version vectors to determine a variety of information associated with the usage pattern of a user or a group of users.

For example, various logs or analytics may be generated by mining the version vector data. The analytics can indicate, among other things, which type of computing device is used (e.g. a phone or a tablet), which application is used (e.g. the Angry Bird® game or the Google Maps®), at what time of the day, at what geographic location, using what type of connection (Wi-Fi or 4G LTE network), etc.

Based on the above various information obtained from the analytics, certain usage pattern of an individual user can be determined. For example, it may be shown that an individual user tends to play the Angry Bird® game (the type of application) only on a tablet (the preference of device), between the hours of 7-9 pm (the most likely time of usage).

Once an individual user's usage pattern is determined, the technology further enables performance optimization of the computing devices in various ways. At least one way to achieve optimization is to customize the user's computing devices and applications according to his or her usage pattern, thus rendering better user experience, saving power consumption, bandwidth, memory space, etc. For example, when the user's computing device is low on battery and recharging is inconvenient, understanding the user's usage pattern could help decide which applications are less used and should be disabled in order to save battery.

Similarly, another aspect of this technology is to analyze the version vector data of a group of users, thereby determining the usage patterns of a group of users. For example, this technology may show a pattern that the Netflix subscribers tend to use Netflix Internet video streaming service the most on Friday night, with peak hours around 8-11 pm; but they tend to have the least demand on Monday night. Thus various methods could be used to conserve resources while making streaming smoother at peak hours, such as caching content in servers, adding servers, or other load balancing methods. With the usage patterns of a group of users, a service provider can use this technology to optimize performance on a system level. For example, a service provider may analyze its subscribers' usage patterns, use those patterns to predict supply and demand for a product or service at a certain time during the day, the week, or any relevant time frame, and adjust its systems accordingly.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
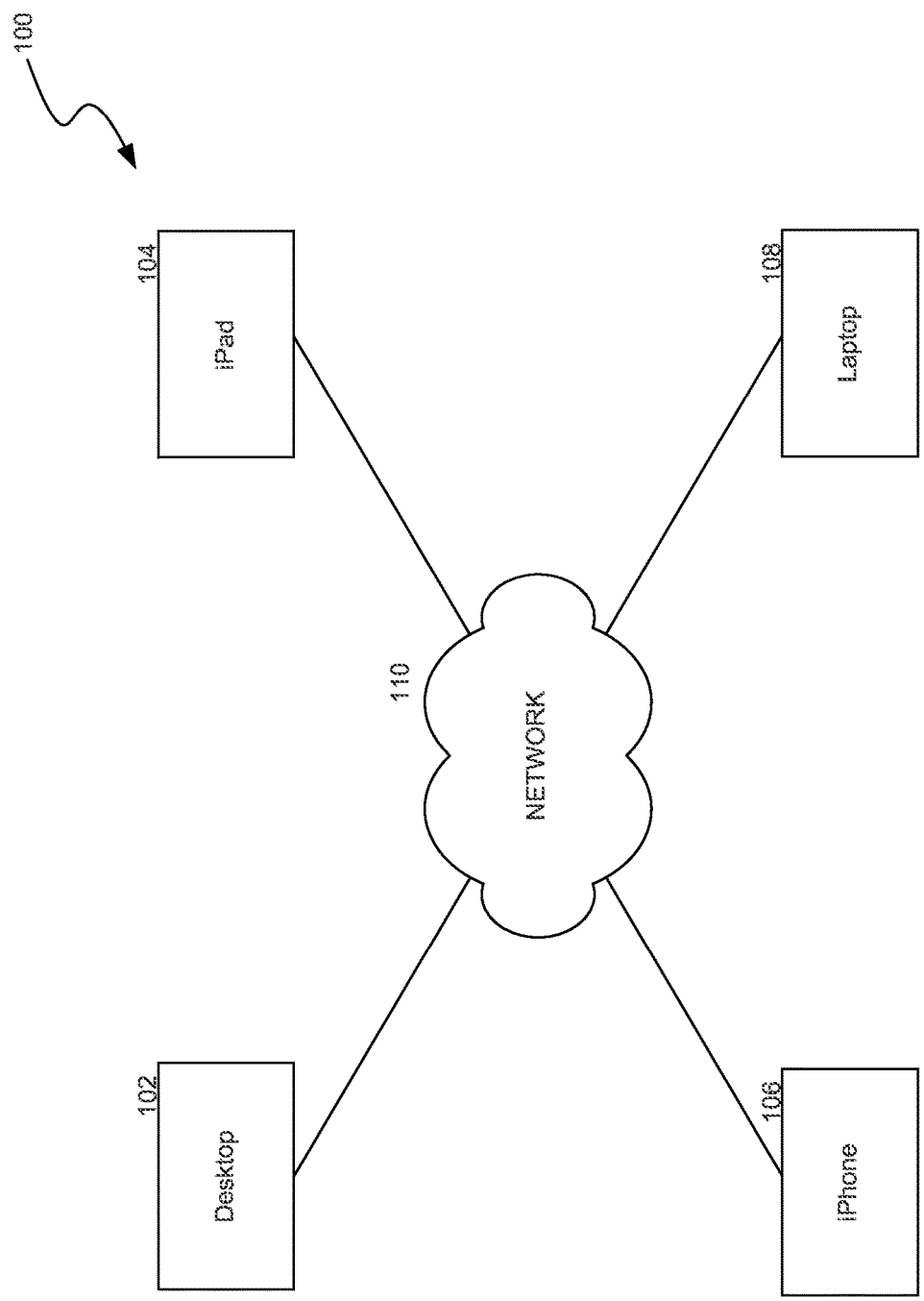
FIG. 1 is an environment of multiple computing devices connected to a network.

FIG. 1 is a block diagram illustrating an environment 100 of multiple computing devices 102-108 connected to a network 110. The computing devices that a user uses may vary depending on geographic locations and time of day. The computing devices 102-108 can be a desktop computer, a laptop computer, a tablet computer, a game console, a smart phone, a personal digital assistant, or other electronic devices capable of running computer applications, as contemplated by a person having ordinary skill in the art.

The network 110 can be a local area network (LAN), wide area network (WAN) or the Internet. The computing devices 102-108 may be connected to the network 110 through a number of ways, such as Wi-Fi, 4G LTE, LAN, WAN, Bluetooth, etc. Network communication hardware and network connection logic may be included to receive the information from computing devices. The computing devices can send data to and receive data from the network.

In some embodiments, some or all of the computing devices 102-108 may be connected to a cloud server (not illustrated). The network connections can include Transmission Control Protocol (TCP) connections, User Datagram Protocol (UDP) connections, or other types of network connections based on other protocols. When there are multiple computer applications that need network connections to multiple remote servers (not illustrated), the computing devices only need to maintain one network connections with the cloud server. The cloud server will in turn maintain multiple connections with the remote servers on behalf of the computer applications.

Although FIG. 1 illustrates four computing devices 102-108, a person having ordinary skill in the art will readily understand that the technology disclosed herein can be applied to a single computing device or more than two computing devices connected to the network.

In one embodiment, the computing devices 102-108 belong to the same user. A user can upload data files from one or more of the computing devices 108 to a remote server (not illustrated) via a communication network 110. In another embodiment, the computing devices 102-108 belong to a group of users. Each user may operate multiple computing devices at different time and locations.

Figure 2:
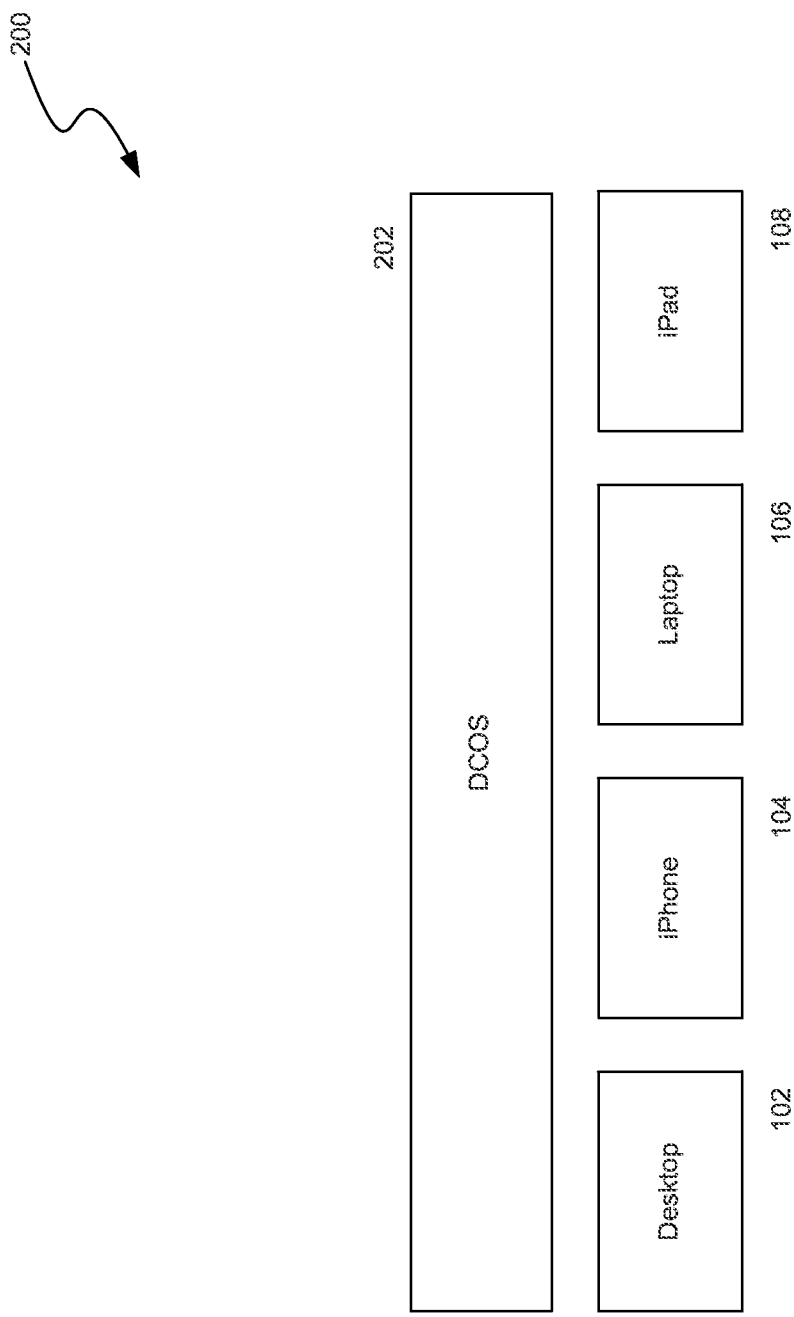
FIG. 2 illustrates an environment of multiple computing devices connected to a network and managed via a decentralized operating system ("DCOS").

FIG. 2 is a block diagram 200 illustrating a decentralized operating system ("DCOS") 202 managing the multiple computing devices 102-108 as a single entity. For instance, the technology enables the use of the user interface of any of plurality of computing devices to interact with the DCOS 202 and to install an application on the DCOS 202. The application is installed on an application layer of the DCOS 202, where any of the computing devices being managed by the DCOS 202 can invoke the application installed on the application layer of the DCOS 202. Thus, a separate installation of the application on each of the computing devices may not be required to execute the application through any of the computing devices if the application is installed through the DCOS 202. In one embodiment, version vectors can be generated at the DCOS kernel.

Figure 3:
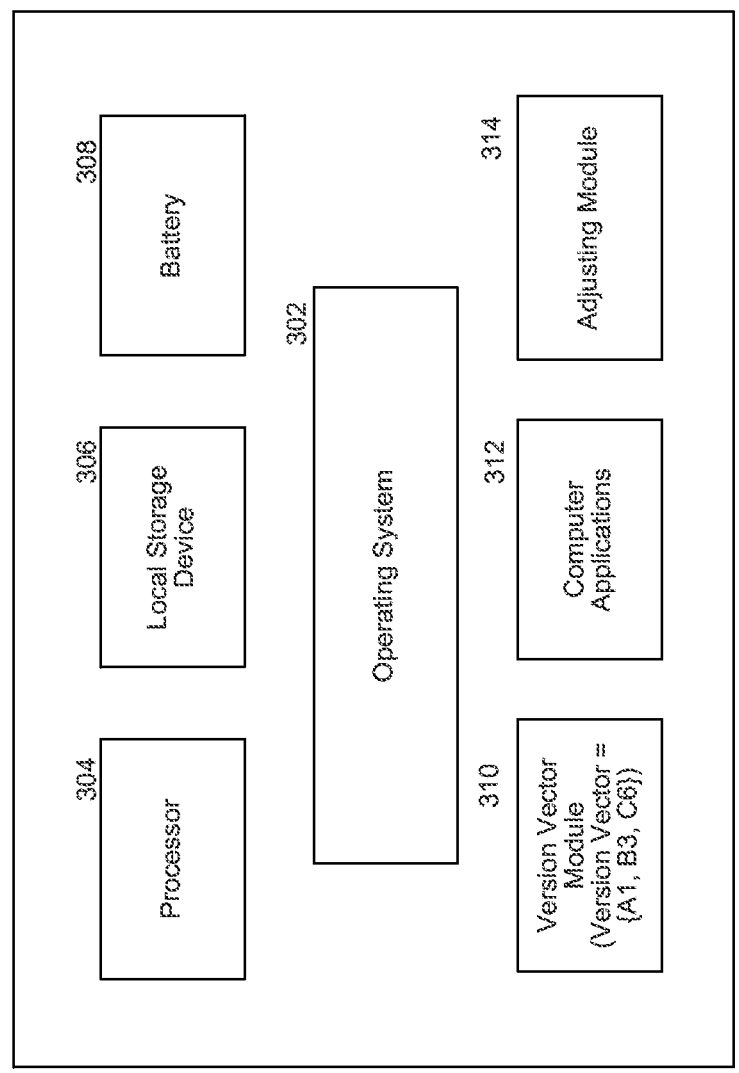
FIG. 3 is a block diagram illustrating a computing device in the network.

FIG. 3 is a block diagram illustrating a computing device 300. The computing device 300 can be any of a desktop computer, a laptop computer, a tablet computer, an automobile computer, a game console, a smartphone, a personal digital assistant, or other computing devices capable of running computer applications, as contemplated by a person having ordinary skill in the art. In some embodiments, the computing device 300 can be similar to any of computing devices 102-108.

Typically, the hardware resources of the computing device 300 can include central processing units ("CPU"), storage devices, graphics processing units ("GPU"), network communication hardware, a display screen, a video camera, a microphone, etc. The storage devices can include optical disk storage, RAM, ROM, EEPROM, flash memory, phase change memory, magnetic cassettes, magnetic tapes, magnetic disk storage, or any other computer storage medium which can be used to store the desired information.

The computing device 300 may include an operating system 302 to manage the hardware resources of the computing device 300, and to provide services for running computer applications 312 (e.g., mobile applications running on mobile devices). The operating system 302 facilitates execution of the computer applications 312 on the computing device 300. The computing device 300 includes at least one local storage device 306 to store the computer applications 312 and/or user data.

The computer applications 312 stored in the computing device 300 can include applications for general productivity and information retrieval, including email, calendar, contacts, and stock market and weather information. The computer applications 312 can also include applications in other categories, such as mobile games, factory automation, GPS and location-based services, banking, order-tracking, ticket purchases or any other categories as contemplated by a person having ordinary skill in the art.

The computing device 300 can include a version vector module 310, which enables generating version vectors. The version vectors may be structured in different ways to reflect a variety of information regarding how the user tends to use the computing device 300 and the computer applications 312 stored therein. The computing device 300 can further include an adjusting module 314, which enables adjusting and optimizing systems according to the user's usage pattern. In on embodiment, a version vector can take the form {A1, B3, C6}, where A, B and C are device ids and 1, 3, and 6 are their respective version numbers.

In some embodiments, some or all of the computing devices 300 are managed by a DCOS. Further, version vectors may be generated at the DCOS kernel to track updates and modifications occurring at the computing devices 300.

In some embodiments, the computing device 300 may include other modules for various other functions (not illustrated). For example, a socket redirection module may be included to enable connection between computing device 300 and a remote server via a cloud. The socket redirection module can redirect network messages via a cloud server, so that the computer applications and various remote servers (not illustrated) may communicate network messages via the cloud server.

Figure 4:
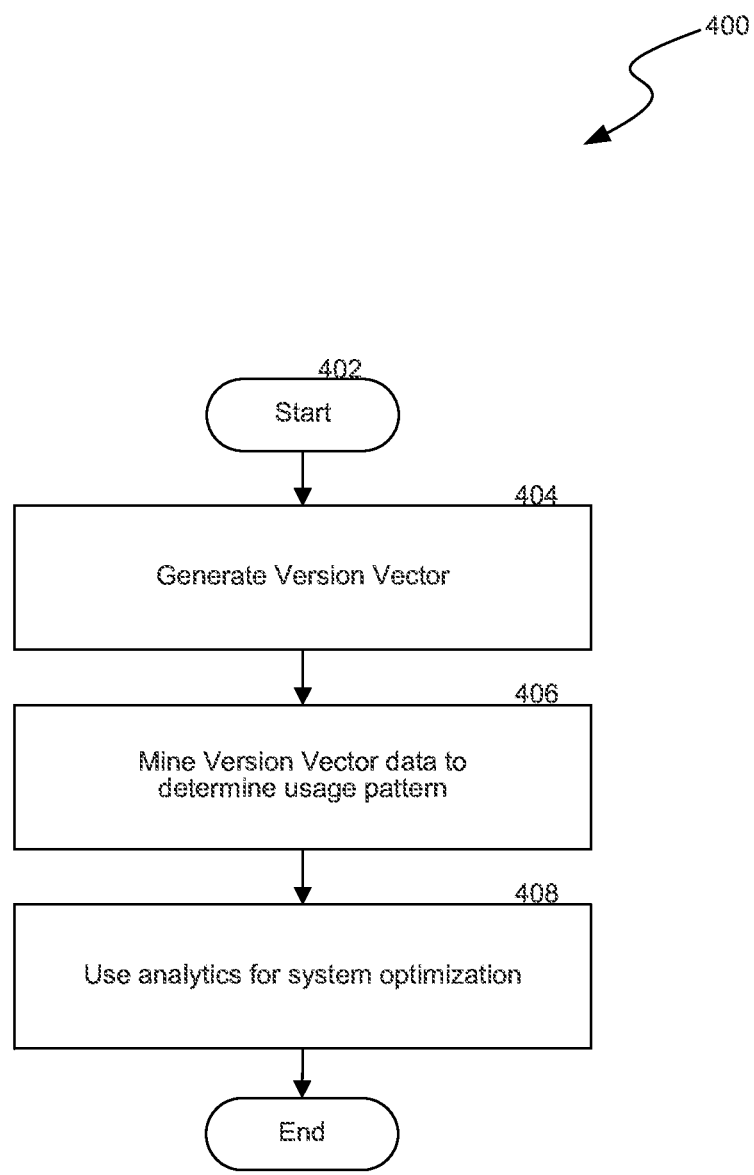
FIG. 4 is a flow diagram a process for determining usage pattern and thereby optimizing performance.

FIG. 4 is a flow diagram of a process 400 for determining usage pattern and thereby optimizing performance. The process 400 may be executed in a computing device such as devices 102-108 of FIG. 1, or devices 204-210 of FIG. 2, or in a remote central server (not illustrated) that receives user data from the various computing devices.

At step 402, the computing device or server receives a request to start the process 400. At step 404, version vectors are generated at the computing device or server by the version vector module 310. At step 406, the processor 304 runs various algorithms to mine the version vector data, thereby determining the user's or the group of users' usage patterns. At step 408, the adjusting module 314 utilizes the usage patterns by applying different algorithms to achieve a variety of optimizations. More details of each step will be explained in connection with the following drawings.

Figure 5:
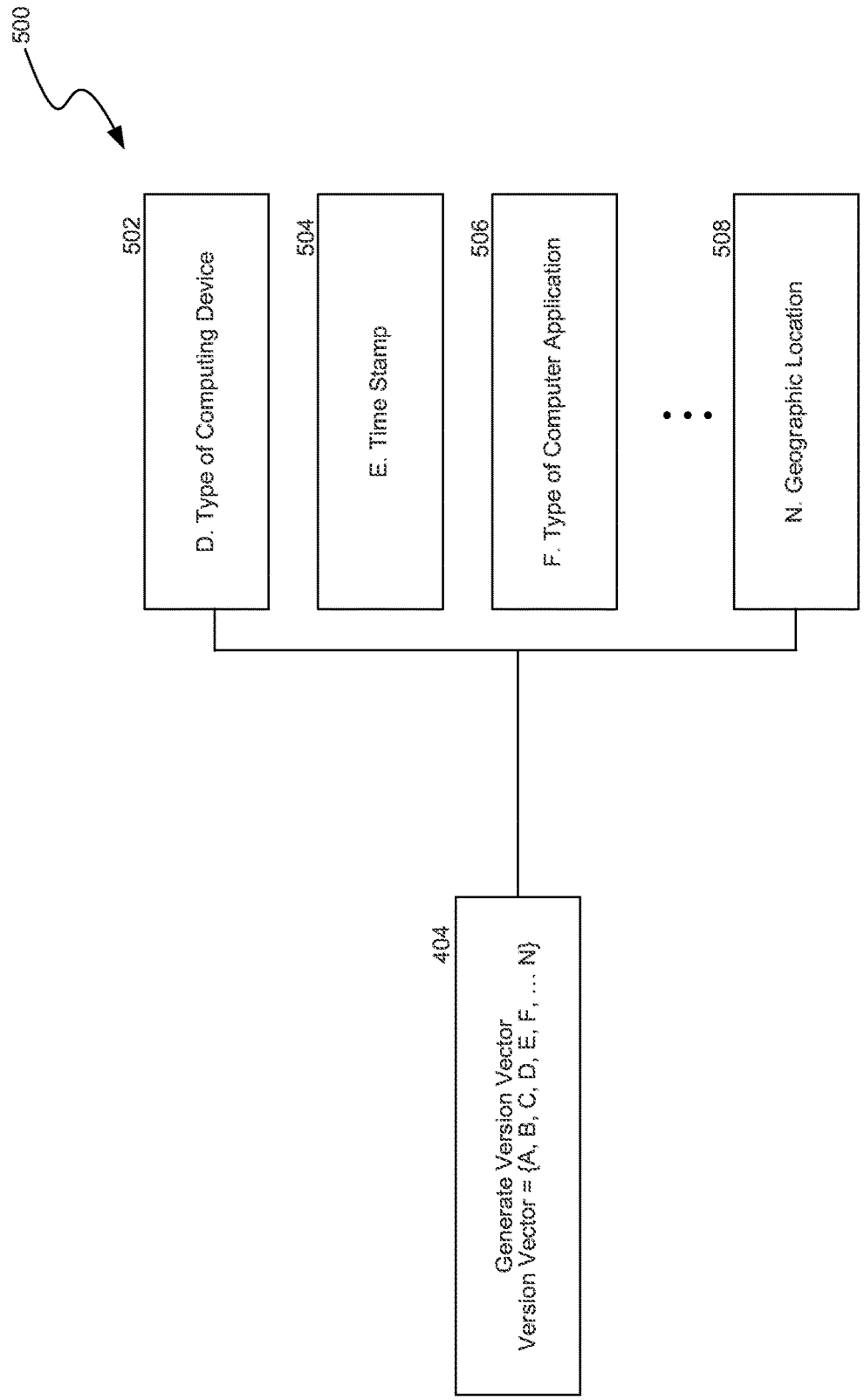
FIG. 5 is a block diagram illustrating various embodiments of the step of generating version vectors.

FIG. 5 is a block diagram illustrating various embodiments of step 404—generating version vectors. The version vectors may be structured in a number of ways. For example, a version vector can take the form {A, B, C, D, E, F, . . . N}, where A, B and C are device ids, and the coordinates D through N may correspond to other different factors. In one embodiment, one of the coordinates may correspond to the type of computing device 502 that the user operates (e.g. a smart phone versus a tablet). In another embodiment, the coordinates may correspond to each of the computing devices and servers in the network. In another embodiment, the version vector may bear a time stamp 504, and thus is able to indicate the time when an update or modification occurs to a certain file in a device. Other examples of version vector data may include the specific applications 506 a user used during the day, the geographic location 508 where the user used the device or application, the type of connection the user used, etc. Therefore, the raw data from version vectors may include logs or histories of how the user (or a group of users) used the computing devices and applications.

Figure 6:
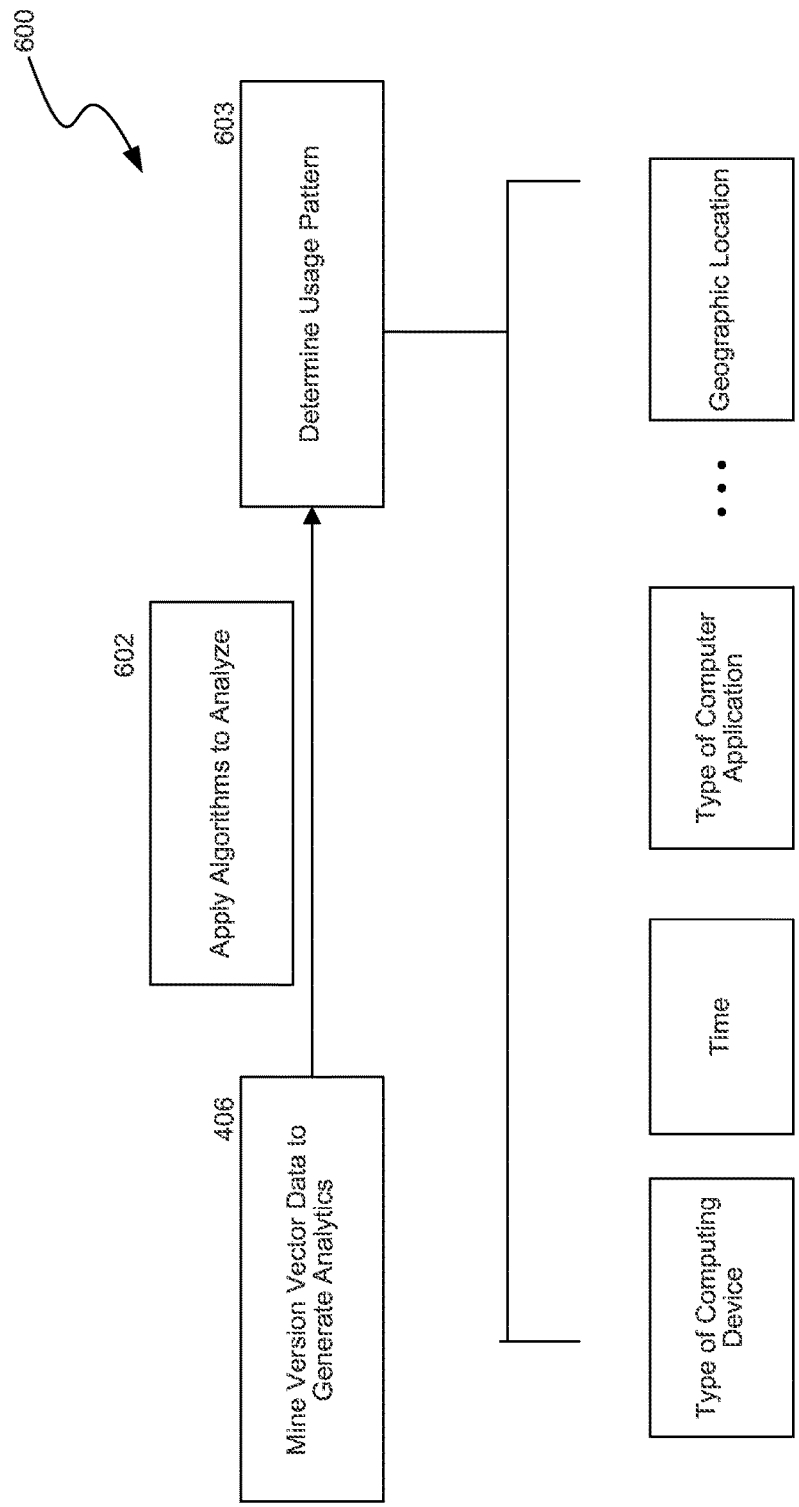
FIG. 6 is a block diagram illustrating generation of analytics from version vector data.

FIG. 6 is a block diagram 600 illustrating generation of analytics. After raw data is obtained from version vectors, various algorithms may be applied 602 to mine the version vector data and generate a series of analytics.

In one embodiment, one of the analytics that can be determined based on the version vector data is a usage pattern 603, e.g., how frequently a user uses a particular computing device. For example, if most of the increments associated with an application (e.g. Angry Bird®) in the version vectors come from a particular computing device (e.g. a tablet), then it indicates that the user tends to use this application Angry Bird® only on a tablet device rather than on a smartphone.

Similarly, in other embodiments, a variety of analytics may be generated by utilizing algorithms to mine version vector data. Examples include, but are not limited to: the most frequently used computer applications, the geographic location of usage, the time of day of usage, the type of communication connection, etc. With these analytics, this technology enables determination of the usage pattern. In one embodiment, the usage pattern is decided on an individual user basis. In another embodiment, the usage patterns of a group of users can be determined. For example, a service provider, such as Netflix, may use the technology to determine the usage patterns of its subscribers in a certain region, i.e. as a group of users.

Figure 7:
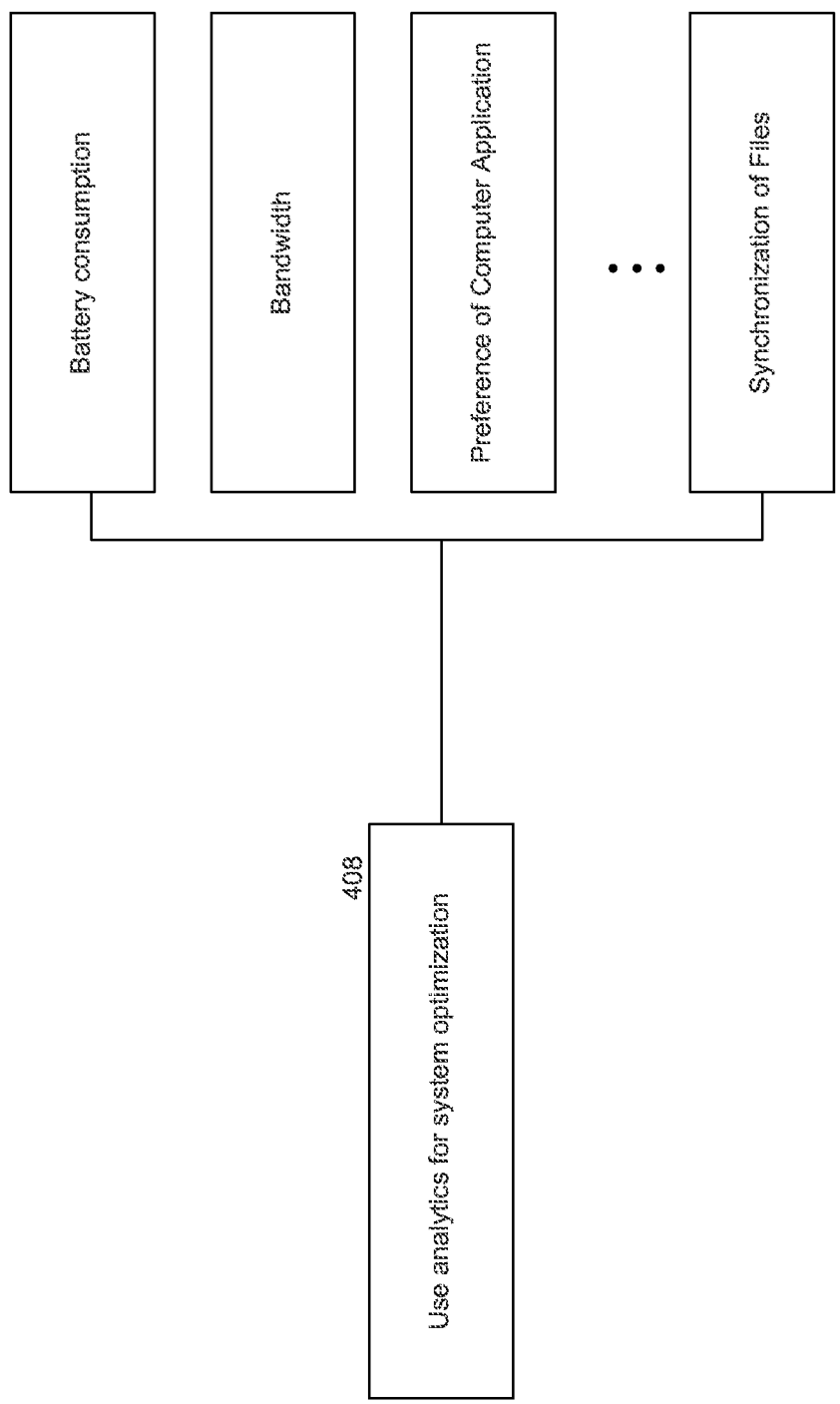
FIG. 7 illustrates an example of utilizing analytics to optimize systems.

FIG. 7 is an example 700 of utilizing the analytics of FIG. 6 to optimize computing devices.

After determining the usage pattern, various changes can be made to the system configuration in order to optimize performance. In one embodiment, optimization may be done on an individual user basis. After an analysis has been conducted to show how a user tends to use his or her computing devices and applications, systems can be optimized according to that usage pattern to better manage resources, such as optimizing power consumption, CPU running time, network component running time, network bandwidth, amount of data to be downloaded, when to push data, etc.

For example, a certain application may be installed on multiple computing devices, such as a desktop computer, a tablet, and a smartphone. Each of the computing devices may generate a version vector that reflects updates made via the application on that computing device. After analyzing the version vector data, it may have been shown that the version vector updates regarding that application all or mostly come from a particular device, such as a smartphone. Then it can be predicted that the user only or mostly uses that application on a smartphone. Accordingly, only phone quality pictures, i.e. low resolution pictures need to be downloaded, in order to save bandwidth, storage space, and battery.

Similarly, an analysis of the version vector data may indicate which computing device a user tends to use when running a certain application, e.g. whether this application is only used on a phone, or both on a phone and on a tablet. In one embodiment, if the usage pattern shows that a particular application is mainly used on a phone and a tablet, but rarely on a desktop or laptop computer, then the same application may be compressed on the desktop and laptop, because it is less likely that the user would operate that application on those devices.

In one embodiment, when the user's cell phone is low on battery but he/she is at a location where recharging is an unrealistic option, information about this user's usage pattern can help prioritize tasks, e.g. which applications are less important and should be disabled in order to conserve battery use, what backup process should be performed to save data and progress, when switching computing devices is necessary because battery outage is about to happen, etc.

In one embodiment, a user's usage pattern can facilitate synchronization of file updates among his or her multiple computing devices. For example, the information associated with the type of computing device being used can be obtained from the version vector data. This information can help resolve conflicts between file modifications initiated on different computing devices. When concurrent modifications of one file occurred on multiple computing devices, the user is often required to make a decision which modification on which computing device wins. However, this technology may be used to analyze and indicate a preference pattern over time (e.g. the user always selects a modification made on a cell phone over one made on a desktop). Accordingly, the selection can be automatically made, and the file is synchronized without user intervention.

Another aspect of this technology is to utilize the usage patterns of a group of users to optimize performance at a holistic, service provider level. In one embodiment, when the version vectors data is generated for a group of users, a service provider can mine the data to obtain usage patterns of the group, which enables service optimization in many different ways. For example, the service provider can track which applications are most downloaded or used at a certain geographic location. Based on that information, the service provider can make recommendations on useful and interesting applications for users to download when they travel to that location. As another example, a company like Netflix can keep track of the peak hours and off-peak hours for its Internet video streaming service, so that it can plan services accordingly, such as caching content in servers, adding servers, or other load balancing methods.

Figure 8:
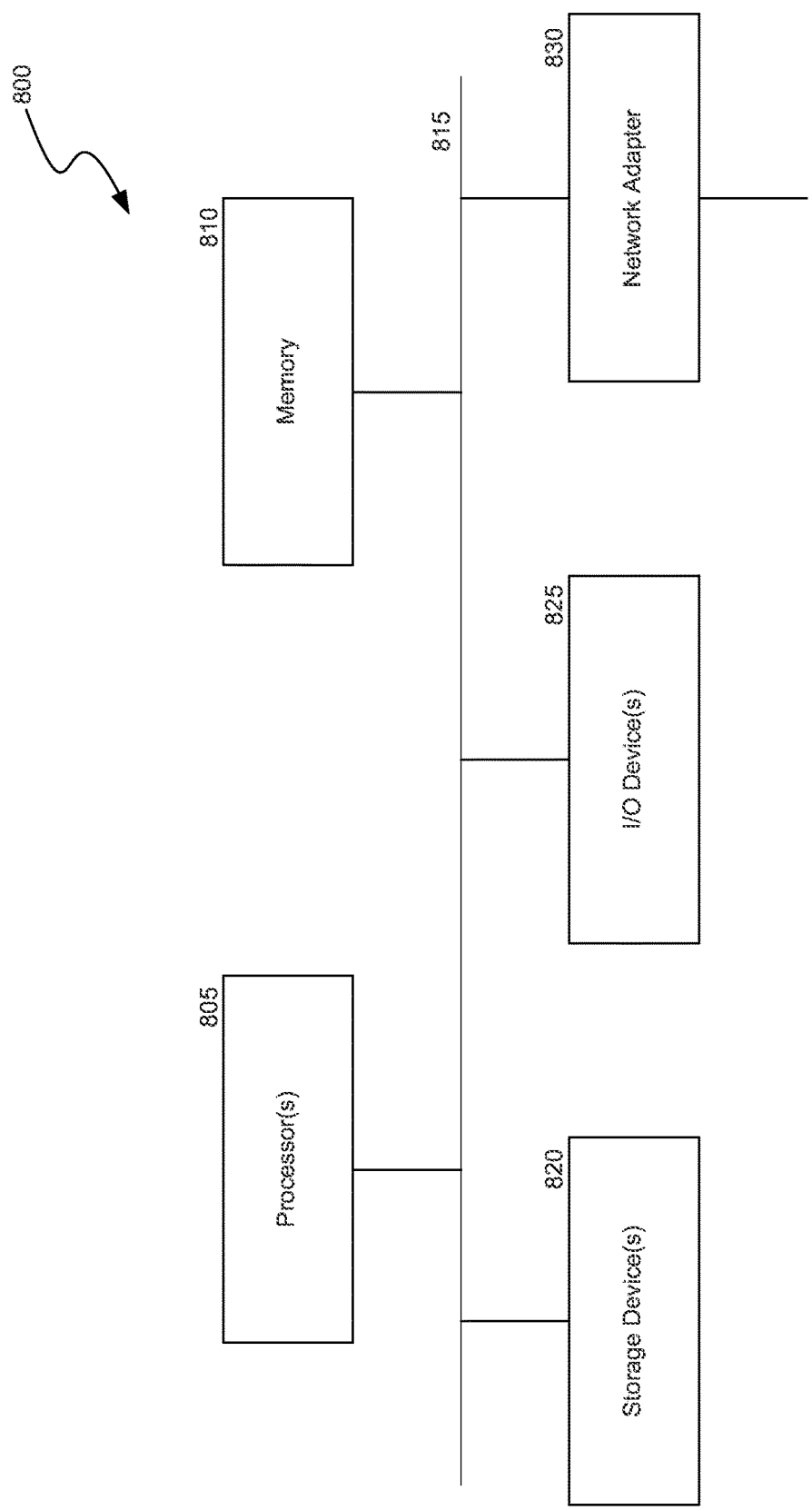
FIG. 8 is a block diagram of a computer system as may be used to implement features of some embodiments of the disclosed technology.

FIG. 8 is a block diagram of a computer system as may be used to implement features of some embodiments of the disclosed technology. The computing system 800 may be used to implement any of the entities, components or services depicted in the examples of FIGS. 1-7 (and any other components described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "FireWire®".

The memory 810 and storage devices 820 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed:

1. A method of optimizing system performance, the method comprising:

generating a version vector corresponding to updates having occurred on a computing device, the version vector including a plurality of attributes associated with the computing device, wherein the plurality of attributes associated with the computing device include a device type of the computing device and a time of day when a user of the computing device used one or more computer applications;

analyzing the plurality of attributes from the version vector to determine a usage pattern of the user of the computing device, the usage pattern comprising a preference pattern, wherein the preference pattern is determined over time based in part on the device type of the computing device and based in part on a plurality of user selections made over time for a plurality of file updates to apply to a file during a plurality of conflicts of multiple concurrent file updates to the file on the computing device and another computing device, the plurality of user selections made over time determined from respective version vector data determined for the computing device and the other computing device; and adjusting a configuration of the computing device based on the usage pattern, wherein the adjusting of the configuration of the computing device comprises:

adjusting, based on the usage pattern, a CPU running time of the computing device; and based on occurrence of a subsequent conflict of multiple concurrent file updates to the file on the computing device and the other computing device, automatically selecting, based on the preference pattern determined over time, and without user intervention, a particular file update of the subsequent conflict of multiple concurrent file updates to apply to the file on the computing device and on the other computing device.

2. The method of claim 1, wherein the version vector is generated by a decentralized operating system in a communication network.

3. The method of claim 1, wherein the plurality of attributes associated with the computing device further include a location where the user used the computer applications.

4. The method of claim 1, wherein the usage pattern of the user includes one or more of a type of computing device used by the user, one or more computer applications being used by the user, a time of day when the user used the computer applications, and a location where the user used the computer applications.

5. The method of claim 1, wherein the adjusting of the configuration of the computing device further comprises compressing one or more files associated with each of a plurality of applications on a plurality of computing devices when the usage pattern indicates that the user is unlikely to use said applications on said computing devices.

6. The method of claim 1, wherein the adjusting of the configuration of the computing device further comprises downloading low resolution images for a computer application, if the usage pattern indicates that the user uses the computer application on a mobile computing device, the mobile computing device comprising one or more of smartphones and tablets.

7. The method of claim 1, wherein the adjusting of the configuration of the computing device further comprises, when the computing device is low on battery, prioritizing a plurality of tasks according to the usage pattern, wherein the prioritizing comprises:

performing a backup process to save data and a state of a plurality of computer applications;

disabling a set of the computer applications whose usage is less than a specific threshold; and notifying, to the user, when to switch to another computing device.

8. The method of claim 1, wherein the version vector is a first version vector, and the adjusting of the configuration of the computing device includes synchronizing data between a plurality of computing devices including the computing device and the other computing device, the synchronizing comprising:

generating the first version vector, the first version vector corresponding to the file updates to the file on the computing device;

generating a second version vector, the second version vector corresponding to updates to the file on the other computing device of the plurality of computing devices, the second version vector including a plurality of attributes associated with the other computing device, including a device type of the other computing device and a time of day when a user of the other computing device used one or more computer applications on the other computing device;

determining the preference pattern over time based in part on the first version vector and the second version vector.

9. The method of claim 1, wherein the usage pattern is determined for a group of users.

10. The method of claim 9, further comprising:

adjusting a server based on the usage pattern, the server providing a service to the computing device.

11. The method of claim 1, wherein the adjusting of the configuration of the computing device comprises recommending, according to the usage pattern, a computer application to be downloaded on the computing device.

12. An apparatus for optimizing system performance, the apparatus comprising:

a memory; and at least one processor coupled to the memory and configured to:

generate a plurality of version vectors corresponding to updates having occurred on the apparatus, the plurality of version vectors including a plurality of attributes of the apparatus, the plurality of attributes including a device type of the apparatus and a time of day when a user of the apparatus used one or more computer applications;

analyze the plurality of attributes from the plurality of version vectors to determine a usage pattern of the user of the apparatus, the usage pattern comprising a preference pattern, wherein the preference pattern is determined over time based in part on the device type of the apparatus and based in part on a plurality of user selections made over time for a plurality of file updates to apply to a file during a first plurality of conflicts of multiple concurrent file updates to the file on the apparatus and on a first computing device, the plurality of user selections made over time determined from respective version vector data determined for the apparatus and the first computing device; and adjusting a configuration of the apparatus based on the usage pattern, wherein the adjusting of the configuration of the apparatus comprises:

adjusting, based on the usage pattern, a CPU running time of the apparatus; and based on occurrence of a subsequent conflict of multiple concurrent file updates to the file on the apparatus and the first computing device, automatically selecting, based on the preference pattern determined over time, and without user intervention, a particular file update of the subsequent conflict of multiple concurrent file updates to apply to the file on the apparatus and on the other computing device.

13. The apparatus of claim 12, wherein the apparatus is a personal computing device or a server connected to a communication network.

14. The apparatus of claim 12, wherein the at least one processor is further configured to determine the usage pattern for a group of users.

15. The apparatus of claim 12, wherein, to adjust the configuration of the apparatus, the at least one processor is configured to compress one or more files associated with each of a plurality of applications on a plurality of computing devices, when the usage pattern indicates that the user is unlikely to use said applications on said computing devices.

16. The apparatus of claim 12, wherein, to adjust the configuration of the apparatus, the at least one processor is configured to download low resolution pictures for a computer application when the usage pattern indicates that the user uses the computer application on a mobile computing device, the mobile computing device comprising one or more of smartphones and tablets.

17. The apparatus of claim 12, wherein, to adjust the configuration of the apparatus, the at least one processor is configured to, when the apparatus is low on battery, prioritizing a plurality of tasks according to the usage pattern, wherein the prioritizing comprises:
  performing a backup process to save data and a state of a plurality of computer applications;
  disabling a set of the computer applications whose usage is less than a specific threshold; and
  notifying, to the user, when to switch to another computing device.

18. A method of synchronizing data between a plurality of computing devices, the method comprising:
  generating a first version vector, the first version vector corresponding to a plurality of file updates to a file on a first computing device of the plurality of computing devices;
  generating a second version vector, the second version vector corresponding to a plurality of file updates to the file on a second computing device of the plurality of computing devices;
  based on the plurality of file updates to the file on the first computing device and the plurality of file updates to the file on the second computing device occurring concurrently a plurality of times to cause a plurality of conflicts, receiving a plurality of user selections indicating which of the file updates to apply to the file to synchronize the file on the first computing device and the second computing device;
  analyzing the first version vector and the second version vector to determine a usage pattern, the usage pattern comprising a preference pattern determined over time based in part on the plurality of user selections made over time in response to the plurality of conflicts, the plurality of user selections made over time determined from the first version vector and the second version vector, wherein the preference pattern is further determined based in part on a plurality of attributes of the first and second version vectors, the plurality of attributes including a device type of the first computing device, a device type of the second computing device, and a time of the day one of the file updates is selected by the user to resolve the conflict; and
  based on occurrence of a subsequent conflict between updates to a file on different computing devices of the plurality of computing devices, selecting automatically based on the preference pattern determined over time, and without user intervention, an update to apply to the file on the different computing devices to resolve the subsequent conflict, a configuration of a given computing device of the plurality of computing devices being further adjusted based on the usage pattern, wherein the adjusting of the configuration of the given computing device comprises adjusting, based on the usage pattern, a CPU running time of the given computing device.

* * * * *